United States Patent [19]

Kennedy

[11] Patent Number: 4,676,415
[45] Date of Patent: Jun. 30, 1987

[54] SLIDE-OUT BUMPER AND TIRE CARRIER

[76] Inventor: Albert B. Kennedy, P.O. Box 385, Goodman, Mo. 64843

[21] Appl. No.: 809,334

[22] Filed: Dec. 16, 1985

[51] Int. Cl.$^4$ ............................................. B62D 43/00
[52] U.S. Cl. .............................. 224/42.06; 224/42.23; 414/466
[58] Field of Search ............... 224/42.05, 42.23, 42.12, 224/42.21, 42.06, 42.29; 414/463, 466

[56] References Cited

U.S. PATENT DOCUMENTS

| | | | |
|---|---|---|---|
| 1,815,943 | 7/1931 | Glenn | 224/42.05 |
| 2,052,483 | 8/1936 | Monteith | 224/42.05 |
| 2,080,989 | 5/1937 | Smith | 414/466 |
| 3,554,415 | 1/1971 | Woods | 224/42.23 X |
| 3,618,835 | 11/1971 | Terry et al. | 224/42.23 X |
| 3,682,360 | 8/1972 | Fletcher et al. | 224/42.23 X |
| 3,698,609 | 10/1972 | Lund | 224/42.05 |
| 4,312,620 | 1/1982 | Muschalek, Jr. | 224/42.23 X |
| 4,418,852 | 12/1983 | Grinwald | 224/42.23 |

Primary Examiner—Stephen Marcus
Assistant Examiner—Robert M. Petrik
Attorney, Agent, or Firm—Harvey B. Jacobson

[57] ABSTRACT

A combined spare tire support and rear step bumper assembly is provided wherein the rear step bumper assembly is mounted from the associated vehicle in the conventional manner but includes a center downwardly and rearwardly opening recess formed therein in which the outer face plate of a drawer-type support extendible rearwardly of the bumper assembly is receivable when the support is in the forward retracted position. The support is in the form of an upwardly opening drawer in which a spare tire assembly (or any other suitable load) may be received and structure is provided for releasably securely locking the face plate assembly of the drawer-type support in a forwardly retracted closed position. Further, the face plate assembly includes the usual lower central horizontal flange of a step bumper from which a trailer ball hitch element may be mounted and the structure provided for locking the face plate assembly of the drawer-type support in the closed position, in conjunction with the conventional step bumper mounting structure increases the trailer load capacity of the step bumper assembly beyond the trailer load carrying capacity of a conventional step bumper.

6 Claims, 6 Drawing Figures

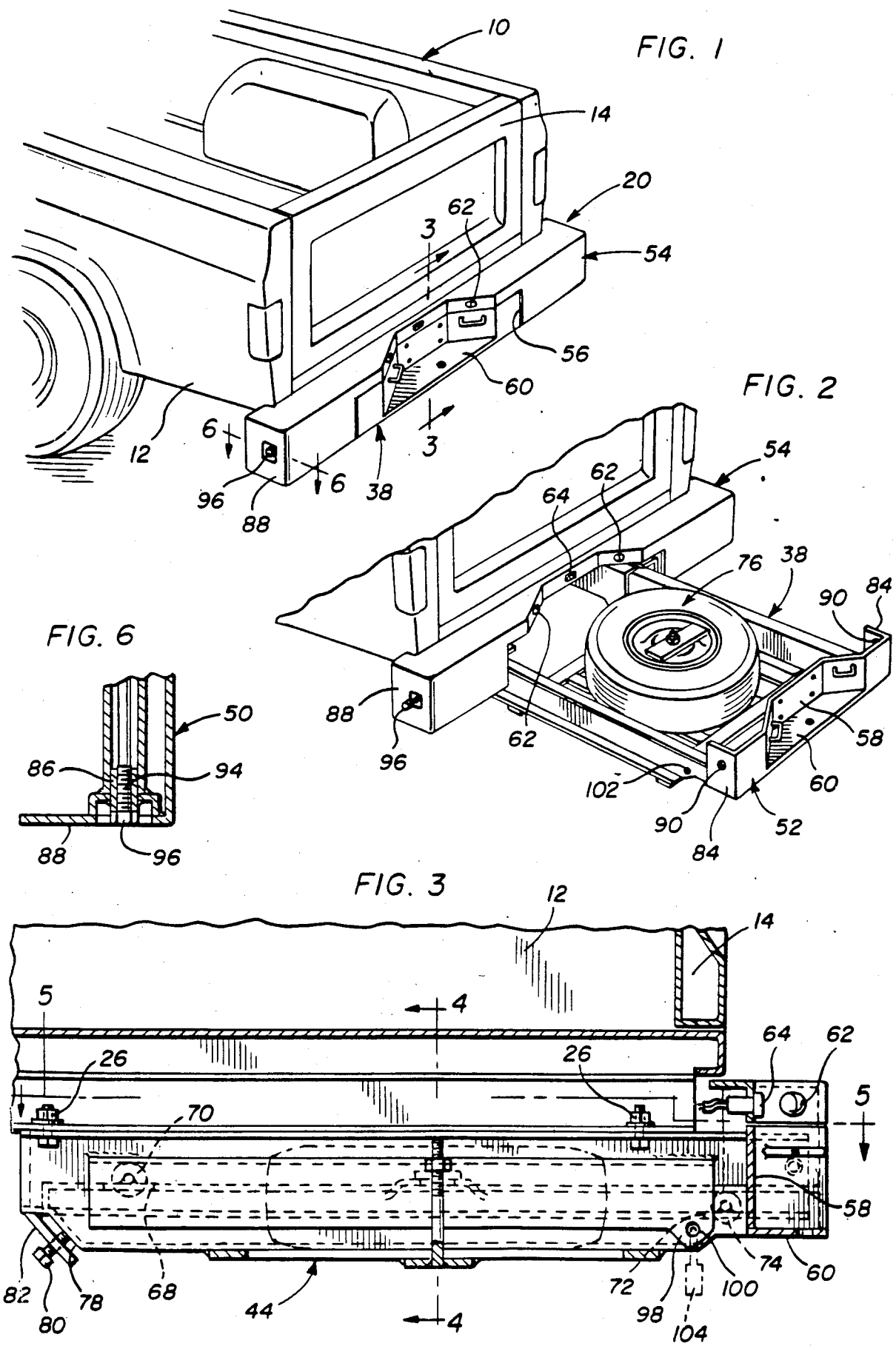

SLIDE-OUT BUMPER AND TIRE CARRIER

BACKGROUND OF THE INVENTION

1. Field of the Invention

The tire carrier of the instant invention is incorporated into and forms a part of the structure by which a step-bumper is mounted on the rear of a pick-up truck. The tire carrier comprises a drawer-like structure including an outer face received in a downwardly opening recess formed in the central portion of an otherwise conventional step bumper and the drawer-like structure is mounted from guides provided therefore mounted from the frame rails of the vehicle. Further, the face of the drawer-like structure includes the usual lower central flange of a step bumper from which a hitch ball may be supported and the drawer-like structure (for supporting a spare tire) is securely releasably lockable within the downwardly opening recess formed in the stationary portion of the step pumper when the drawer-like structure is in the closed position.

2. Description of Related Art

Various different forms of spare tire carriers for pick-up trucks and similar vehicles heretofore have been provided and many of these spare tire carriers are of the slide-out type. However, most pick-up trucks and other similar vehicles equipped with load beds mount the spare tires thereof beneath the load bed in order that the load bed may be used to its maximum load carrying capacity. In addition, such vehicles are usually equipped with step bumpers to assist in gaining access to and alighting from the associated load beds. Accordingly, a need exists for a slide-out spare tire carrier incorporated into a step bumper but which will not lessen the ability of the step bumper to be used for supporting a trailer ball hitch member therefrom in the usual manner.

SUMMARY OF THE INVENTION

The tire carrier of the instant invention is constructed, generally, in the form of a drawer-type carrier including an outer face receivable within a dowwardly opening recess formed in an otherwise basically conventional step bumper. The face of the drawer when the latter is in the closed position, completes the face of step bumper incorporating the usual lower central horizontal flange portion from which a trailer ball hitch element may be supported. The face or face portion of the tire carrier, when in the retracted position, is securely releasably anchorable in the afoementioned recess and the drawer-type carrier is supported from substantial guides mounted from the side frame rails of the associated vehicle. Accordingly, the slide-out and drawer-type tire carrier of the instant invention is incorporated into a step bumper in a manner such that the trailering load capacity of the step bumper is not decreased and ready access may be had to a spare tire supported from the tire carrier.

The main object of this invention is to provide a spare tire carrier for pick-up trucks and vans as well as other similar vehicles to enable ready access to an associated spare tire supported therefrom.

Another object of this invention is to provide a spare tire carrier including a drawer-type support for a spare tire incorporated into an otherwise generally conventional step bumper and with the face of the drawer-type tire carrier forming a central lower portion of the associated step bumper receivable within a downwardly opening recess formed in the step bumper when the tire carrier is in its forwardly retracted position.

Yet another important object of this invention is to provide a spare tire carrier in accordance with the preceding objects and which incorporates the usual lower central flange portion of the step bumper from which a trailer hitch ball element may be supported.

Another important object of this invention, in accordance with the immediately preceding object, is to provide a spare tire carrier and hitch ball element supporting apparatus incorporated into an otherwise generally conventional step bumper and constructed in manner such that the trailering load capacity of the step bumper is not diminished.

Still another object of this invention is to provide a slide-out bumper and tire carrier which may be readily mounted from an associated pick-up truck, van or other similar vehicle.

A final object of this invention to be specifically enumerated herein is to provide a slide-out tire carrier incorporated into a step bumper and which will conform to conventional forms of manufacture, be of simple construction and easy to use so as to provide a device that will be economically feasible, and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the rear of a typical pick-up truck with the step bumper and slide-out spare tire carrier of the instant invention operatively associated therewith and with the spare tire carrier in a forwardly retracted position;

FIG. 2 is a fragmentary perspective view similar to FIG. 1 with the tire carrier in a rearwardly extended open position to provide access to the associated spare tire;

FIG. 3 is an enlarged fragmentary vertical sectional view taken substantially upon the plane indicated by the section line 3—3 of FIG. 1;

FIG. 6 is an enlarged fragmentary horizontal sectional view taken substantially upon the plane indicated by the section line 6—6 of FIG. 1.

DESCRIPTION OF THE PREFERRED EMBODIMENT

Figure 4:
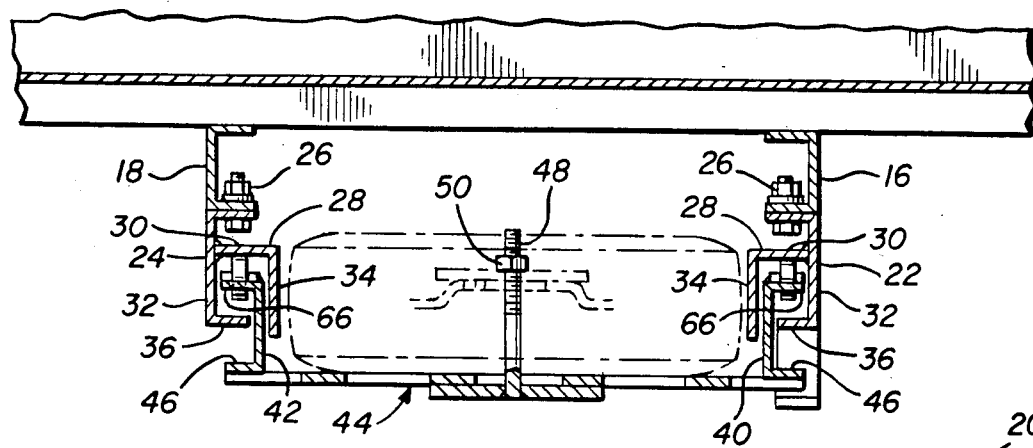
FIG. 4 is a transverse vertical sectional view taken substantially upon the plane indicated by the section line 4—4 of FIG. 3.
Figure 5:
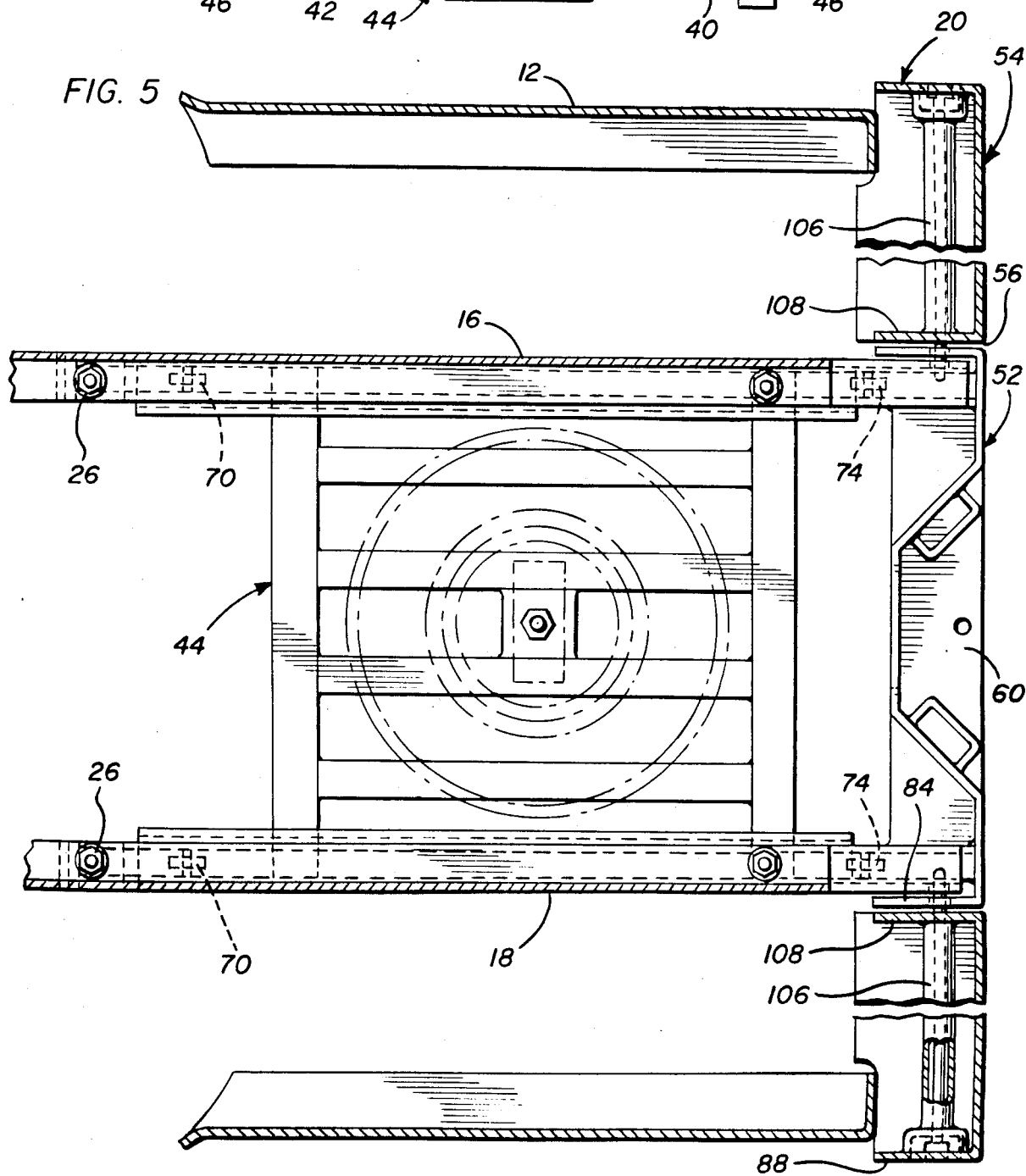
FIG. 5 is a fragmentary horizontal sectional view taken substantially upon the plane indicated by the section line 5—5 of FIG. 3.

Referring now more specifically to the drawings, the numeral 10 generally designates a conventional form of pick-up truck including the usual load bed defining rear body assembly 12 incorporating a vertically swingable tailgate 14 removably closing the rear end of the load bed.

The body assembly 12 is mounted upon opposite side longitudinal frame rails 16 and 18 of the pick-up truck 10 in the usual manner and the combined step bumper and spare tire carrier assembly of the instant invention is referred to in general by the reference numeral 20 and supported from the rear of the pick-up truck 10 in a manner to be hereinafter more fully set forth.

A pair of elongated longitudinally extending channel members 22 and 24 extend along and are secured to the underside of the frame rails 16 and 18 in any convenient manner such as by fasteners 26. The channel members 22 and 24 open inwardly toward each other and include L-shaped angle irons 28 secured thereto. The angle irons 28 include upper horizontal flanges 30 secured to and projecting inwardly from the bight portions 32 of the channel members 22 and 24 and inner depending flanges 34 depending downwardly from the flanges 30 to a level below the lower flanges 36 of the channel members 22 and 24. The upper flanges 30 are spaced above and oppose the lower horizontal flanges 36 of the channel members 22 and 24 and the depending flanges 34 oppose the bight portions 32 and are spaced slightly inward of the innermost edges of the lower flanges 36 of the channel members 22 and 24.

The assembly 20 includes a drawer-type support referred to in general by the reference numeral 38 including a pair of opposite side longitudinally extending outwardly opening channel members 40 and 42 interconnected by means of a frame-type bottom structure referred to in general by the reference numeral 44 extending and secured between the lower flanges 46 of the channel members 40, the bottom structure 44 including a central upwardly projecting spare tire holddown stud 48 having a removable nut 40 threadedly engaged therewith. In addition, the outer rear end of the support 38 includes a face plate assembly referred to in general by the reference numeral 52 extending and secured between the rear outer ends of the channel members 40 and 42 and comprising a lower, central and rearwardly displaceable portion of an otherwise generally conventional step bumper assembly referred to in general by the reference numeral 54. The step bumper assembly 54 is mounted from the frame rails 16 and 18 of the pick-up truck 10 in a conventional manner and defines a central rearwardly and downwardly opening recess 56 in which the face plate assembly 52 is receivable. The face plate assembly 52 includes the usual central inwardly displaced license plate mounting portion 58 and horizontal trailer ball hitch mounting flange 60. The usual license plate illuminating lights are not carried by the face plate assembly 52, but instead are carried by the bumper assembly 54 as at 62 and the central upper portion of the step bumper assembly 54 may include an electrical receptacle 64 of conventional design whereby a plug attached to a trailer mounting harness may be electrically connected to the lighting circuit of the pick up truck 10.

The forward inner ends of the upper flanges 66 of the channel members 40 and 42 have openings 68 formed therethrough and forward inner guide rollers 70 are journaled from the flanges 66 and project through the openings 68 to rollingly engage the underside of the upper flanges 30. In addition, the flanges 36 have similar outer openings 72 formed therethrough and similar rollers 74 journaled therefrom which rollingly engage the undersides of the flanges 66.

In this manner, the support 38 is guidingly supported relative to the channel members 22 and 24 for movement between the forwardly retracted position thereof illustrated in FIG. 1 and the rearwardly extended position thereof illustrated in FIG. 2, a spare tire assembly referred to in general by the reference numeral 76 being freely removable from the support 38 when the latter is in the outer rearward extended position illustrated in FIG. 2.

When the support 38 is in the outer rearwardly extended position, the lower and upper peripheries of the rollers 70 and 74 abut each other and prevent further rearward shifting of the support 38. In addition, the inner forward ends of the channel members 40 include inwardly and upwardly inclined portions 78 abuttingly engageable with threadedly supported outwardly and upwardly inclined stop bolts 80 threaded through threaded bores provided therefor in outwardly and downwardly inclined tab portions 82 supported and depending downwardly from the lower flanges 26 of the channel members 32. Thus, forward inward movement of the support 38 to the retracted position thereof is adjustably limited on each side of the support 38.

The opposite ends of the face panel assembly 52 include forwardly inwardly projecting end flanges 84 and the opposite ends of the step bumper assembly 54 include laterally outwardly opening internally threaded sleeves 86 supported therefrom, recessed laterally inwardly of the opposite end plates 88 of the bumper assembly 54 and aligned with apertures 90 formed in the end flanges 84 when the face plate assembly 52 is in the forwardly inwardly retracted position thereof illustrated in FIG. 1 received within the recess 56. Elongated locking bolts 92 including enlarged externally threaded shank portions 94 adjacent the heads 96 thereof are insertable through the sleeves 86 and into the apertures or bores 90 when the shank portions 94 are threaded into the sleeves 86 with the heads 96 abutted against the sleeves 86. Thus, the face plate assembly 52, and thus the entire support 38, may be securely locked in the inner forwardly retracted recessed position within the recess 38. Still further, the outer rear ends of the depending flanges 34 include downward projections 98 having aperture 100 formed therein registered with corresponding apertures 102 formed in the rear outer ends of the bight portions of the channel members 40 and 42. The hasps of suitable padlocks 104 may be passed through each pair of registered apertures 100 and 102 in order to prevent unauthorized movement of the support 38 toward the rearwardly outwardly extended positions illustrated in FIG. 2.

The bolts 92 pass through sleeve 106 extending transversely of the opposite end portions of the step bumper assembly 54 and having their adjacent ends secured to front-to-rear extending plates 108 of the bumper assembly 54 also including apertures formed therethrough. Accordingly, the adjacent ends of the bolts 92 are suitably braced adjacent the terminal ends thereof which pass through the apertures 100 and 102.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle frame including opposite ends and a bumper assembly supported from and disposed outwardly of one end of said frame, a load support structure, support means supporting said support structure from said one frame and for horizontal guided shifting relative thereto between an inner retracted position retracted at least substantially fully inward of said bumper and an extended outer position extended at least substantially fully outward of said bumper, said support structure and support means including limits means limiting shifting of said support structure to said retracted and extended positions, said support means and bumper including coacting lock means operative to releasably lock said support structure in said retracted position, said support structure defining an upwardly opening storage area in which to receive a load therein, such as a spare tire assembly, said bumper including outer side stationary end portions and a center portion intermediate said end portions carried by said load support structure disposed between said outer side stationary end portions when side load support structure is in said inner retracted position, said outer side end portions including remote oppositely laterally facing side plates, said lock means including elongated fastening means removably secured through said side plates of said outer side stationary end portions and interlockingly engaged with corresponding side portions of center portion.

2. The bumper and load support structure of claim 1 wherein said support structure includes opposite side portions and said limit means includes adjustment means for adjustably limiting movement of each opposite side portion of said load support structure inwardly toward the retracted position thereof.

3. In combination with a vehicle frame including opposite ends and a bumper assembly supported from said disposed outwardly of one end of said frame, a load support structure, support means supporting said support structure from said one frame end for horizontal guided shifting relative thereto between an inner retracted position retracted at least substantially fully inward of said bumper and an extended outer position extended at least substantially fully ouward of said bumper, said support structure and support means including limit means limiting shifting of said support structure to said retracted and extended positions, said support means and bumper including coacting lock means operative to releasably lock said support structure in said retracted position, said support structure defining an upwardly opening storage area in which to receive a load therein, such as a spare tire assembly, said support means including pairs of opposite side vertically spaced apart upper and lower guide flanges, said load support structure including pair of opposite side support flanges having inner and outer ends facing inwardly and outwardly, respectively, of said one end, the inner ends of said support flanges including inner end guide rollers journaled therefrom underlying and rollingly engaged with said upper guide flanges, the outer ends of said lower guide flanges including outer end guide rollers journaled therefrom underlying and rollingly engaged with the corresponding support flanges.

4. The bumper and load support structure of claim 3 wherein inner and outer end guide rollers include portions disposed below and above, respectively, said support flanges and said lower guide flanges, said portions of corresponding inner and outer end guide rollers being abuttingly engageable with each other to define said limit means to limit movement of said load support structure to said extended position.

5. The bumper and load support structure of claim 4 wherein said support structure includes opposite side portions and said limit means includes adjustment means for adjustably limiting movement of each opposite side portion of said load support structure inwardly toward the retracted position thereof.

6. The bumper and load support structure of claim 5 wherein said bumper includes outer side stationary end portions and a center portion intermediate said end portions carried by said load support structure disposed between said outer side stationary end portions when said load support structure is in said inner retracted position, said outer side end portions including remote oppositely laterally facing side plates, said locking means including elongated fastening means removably secured through said side plates of said outer side stationary end portions and interlocking engaged with corresponding side portions of said center portion.

* * * * *